United States Patent

Linhart

[11] Patent Number: 6,087,595
[45] Date of Patent: Jul. 11, 2000

[54] CONNECTION SLEEVE FOR A HOSE FURNISHED WITH A PROTECTIVE COVERING FOR STRAIN-RELIEVED ELECTRICAL CONDUCTORS

[75] Inventor: Georg Peter Linhart, Wöllstadt, Germany

[73] Assignee: Truplast Kunststofftechnik GmbH, Langgons, Germany

[21] Appl. No.: 09/074,441

[22] Filed: May 7, 1998

[30] Foreign Application Priority Data

May 7, 1997 [DE] Germany ......................... 297 08 274 U

[51] Int. Cl.⁷ ..................................................... H01B 7/24
[52] U.S. Cl. .......................................... 174/136; 174/135
[58] Field of Search ............................... 174/136, 74 R, 174/140 R, 68.1, 68.3, 72 C, 70 R, 135, 140 S, 151, 175; 439/456, 457, 458, 459

[56] References Cited

U.S. PATENT DOCUMENTS

| 5,288,946 | 2/1994 | Jackson et al. | 174/74 R |
| 5,599,202 | 2/1997 | Key | 439/459 |
| 5,736,677 | 4/1998 | Sato et al. | 174/65 G |
| 5,817,980 | 10/1998 | Kirma | 174/86 |
| 5,824,962 | 10/1998 | Katsuma | 174/135 |
| 5,884,358 | 3/1999 | Kim | 15/339 |
| 5,921,784 | 7/1999 | Petersen et al. | 439/60 |

FOREIGN PATENT DOCUMENTS

WO98/17936  5/1998  WIPO .
WO98/21024  5/1998  WIPO .

*Primary Examiner*—Kristine Kincaid
*Assistant Examiner*—W. David Walkenhorst
*Attorney, Agent, or Firm*—Horst M. Kasper

[57] ABSTRACT

A connection sleeve for a suction hose is furnished with a protective covering for strain-relieved conductors. The protective covering is attached at an inner jacket face of the suction hose. A first sleeve part engages in part in the suction hose. A recess is furnished in the first sleeve part and a strain-relieving element, guided out of the protective covering, is fixedly positioned in said recess. A second sleeve part, gripping around and encircling the suction hose, covers the recess and the first sleeve part and the second sleeve part are connected to each other. The recess for the strain-relieving element (5) is an annular groove (6). An axial slot (7) extends from an insertion end of the first sleeve part (1). The axial slot (7) passes through a first collar (8), forming a first wall of the annular groove (6), and extends up to a second collar (9), forming a second wall of the annular groove (6). Flanks of the axial slot (7) pass over into a tubular formation (10), formed for receiving a coordinated end of the protective covering (4). The formation (10) is open toward the end of the axial slot (7) and closed at the opposite end. A section of the strain-relieving element (5), forming a loop, encircles a bottom of the annular groove (6), whereas free ends (5a) of the loop are guided through the axial slot (7) into the protective covering (4).

12 Claims, 2 Drawing Sheets

CONNECTION SLEEVE FOR A HOSE FURNISHED WITH A PROTECTIVE COVERING FOR STRAIN-RELIEVED ELECTRICAL CONDUCTORS

BACKGROUND OF THE INVENTION

1. Field of the Invention

The present invention relates to a connection sleeve for a hose furnished with a protective covering for strain-relieved electrical conductors.

2. Brief Description of the Background of the Invention Including Prior Art

A connection sleeve made of a cross-sectionally round rubber hose or tube is known in the art. A relatively short groove, running crosswise to the axis of the first sleeve part, also made of plastic material, is furnished as a recess. The ends of two band-like strain-relieving elements, passing through the wall of the first sleeve part, are inserted into said grooves. These strain-relieving elements are fixedly disposed by material injected into the groove, wherein the injected material easily bonds with the material of the first sleeve part. The second sleeve part is made of the same plastic material as the first sleeve part and is connected to the first sleeve part in its destination position based on the plastic material injected into the groove. The protective covering is closed by a plug at the end disposed near the groove, wherein the plug is formed at the inner side of the first sleeve part. The injecting of the material fastening the ends of the strain-relieving elements and connecting the two sleeve parts to each other is a cost-intensive production process. In addition, it can be seen in the finished products that material was injected into the sleeve parts based on residues.

SUMMARY OF THE INVENTION

1. Purposes of the Invention

It is an object of the present invention to provide a connection sleeve such that the fastening of a strain-relieving element in a first sleeve part and the connection of two sleeve parts do not require an injection procedure.

These and other objects and advantages of the present invention will become evident from the description which follows.

2. Brief Description of the Invention

The present invention provides a connection sleeve for a suction hose furnished with a protective covering for strain-relieved conductors. A first sleeve part has an insertion end and a mouth. A strain-relieving element is disposed at the first sleeve part. An annular groove furnishes a recess for the strain-relieving element and is disposed at the first sleeve part. The strain-relieving element is fixedly positioned in the annular groove. A first collar forms a first wall of the annular groove and a second collar forms a second wall of the annular groove. An axial slot starts at the insertion end of the first sleeve part, passes through the first collar, and extends up to the second collar. The axial slot is open at a first end disposed at the insertion end of the first sleeve and closed at a second end. A suction hose has an inner face and an outer face. A second sleeve part encircles and grips the suction hose and covering the annular groove. A protective covering is attached at the inner face of the suction hose. The first sleeve part engages in part in the suction hose. A tubular formation is formed by flanks of the axial slot for receiving a coordinated end of the protective covering. The formation is open at the first end of the axial slot and closed at the second end of the axial slot. A section of the strain-relieving element, forming a loop, encircles a bottom of the annular groove, whereas free ends of the loop are guided through the axial s,lot into the protective covering. The first sleeve part and the second sleeve part are connected to each other.

The free ends of the loop can be knotted at an area where the bottom of the annular groove passes over into the axial slot.

Wave troughs and wave crests spirally can extend at an outer face of the suction hose. At least one thread can be formed at an inner face of the second sleeve part for providing a screw connection to the wave troughs and wave crests of the suction hose.

An inner groove or stepped recess can be disposed at the second sleeve part and can form-matchingly engage with the second collar near a free end of the second sleeve.

A third collar can be disposed in front of the second collar as seen in direction toward the insertion end of the first sleeve part and can form a stop for a free front face of the second sleeve part.

A fourth collar can be disposed at the first sleeve part in front of the third collar as seen in direction toward the insertion end of the first sleeve part. An opening can be disposed on a face of the first sleeve part between a mouth of the first sleeve part and the fourth collar. The tubular formation can extend up to the opening, wherein the tubular formation is closed only behind said opening, and wherein the electrical conductors are guided from a coordinated end of the protective covering up to the opening and then out of said opening.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
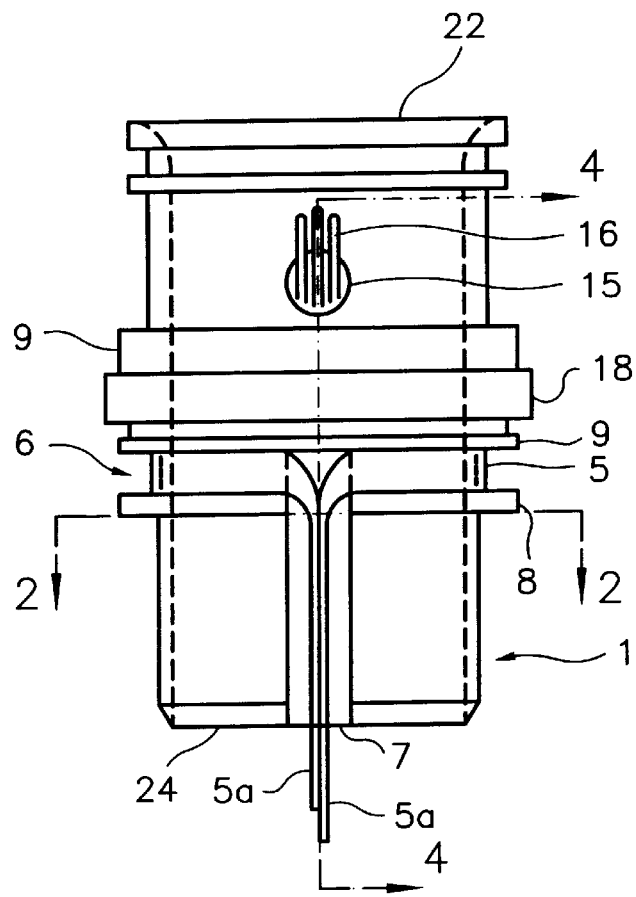
FIG. 1 is a perspective view of a first sleeve part.
Figure 3:
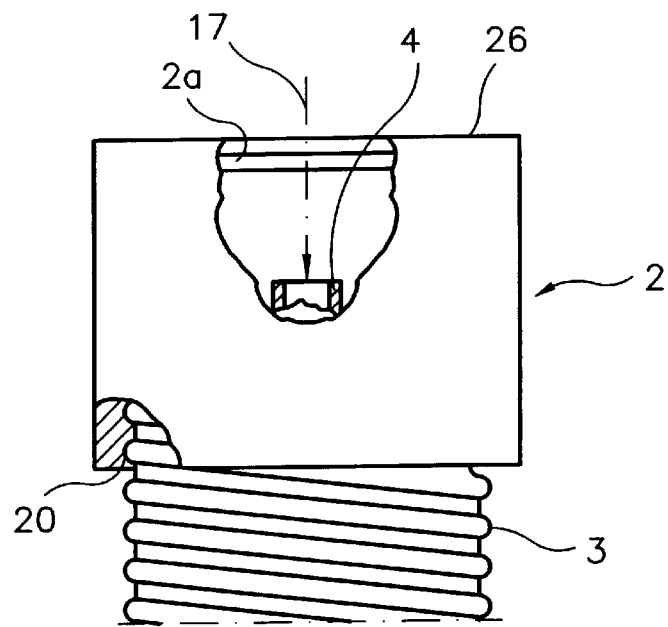
FIG. 3 is a perspective view of a second sleeve part, wherein a hose or tube, exhibiting at its outer face spirally running wave troughs and wave crests, engages into the second sleeve part.

A first sleeve part is designated with reference numeral 1 in FIG. 1, and a second sleeve part is designated with reference numeral 2 in FIG. 3. The two sleeve parts 1, 2 form a connection sleeve for a suction tube or suction hose 3, shown in FIG. 3, wherein the suction hose 3 can for example be employed as a vacuum-cleaner hose. The sleeve part 1 and the suction hose 3 are connected to each other such that the suction hose 3 engages into the second sleeve part 2, and the first sleeve part 1 engages both into the second sleeve part 2 and the suction hose 3. The suction hose 3 exhibits on its outer side spirally running wave troughs and wave crests. A protective covering 4, as illustrated in FIG. 3, is attached in the suction hose 3 for strain-relieved electric conductors 16. The protective covering 4 has a circular cross-section in the embodiment illustrated in FIG. 3.

The first sleeve part 1 has a recess, wherein a strain-relieving element 5, shown in FIG. 1, is disposed in said recess. The recess is formed as an annular groove 6.

The depth and width of the annular groove 6 is selected such as to accommodate the size of the strain-relieving element 5.

Figure 2:
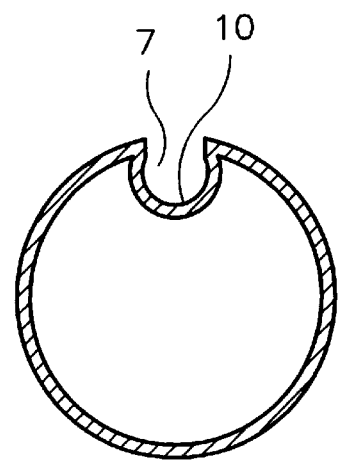
FIG. 2 is a sectional view along section line II—II of FIG. 1.
Figure 4:
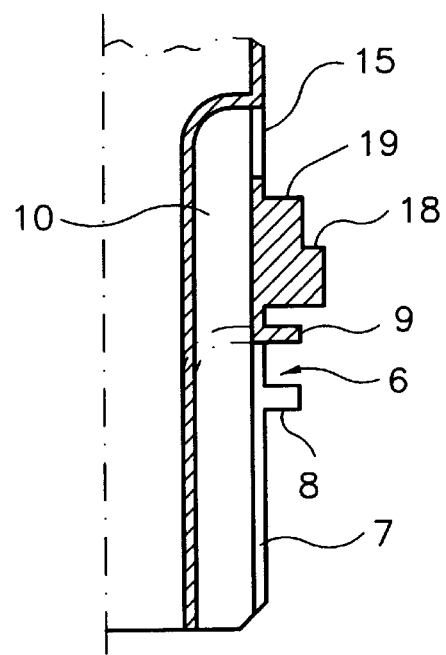
FIG. 4 is a sectional view along section line IV—IV of FIG. 1.

An axially running slot 7 extends from the insertion end 24 of the first sleeve part 1, insertable into the suction hose 3, as shown in FIGS. 1, 2, and 4, through a first collar 8 up to a second collar 9. The two collars 8, 9 form the lateral limitation of the annular groove 6.

The flanks of the slot 7 pass over into a tubular formation 10, as shown in FIGS. 2 and 4, wherein the formation 10 is open like the slot 7 at the insertion end 24 of the first sleeve part 1. The formation 10 is closed at its opposite side. The formation 10,serves for receiving the protective covering 4 in its destination position. The size of the protective covering 4 is such as to fit into the formation 10. The closure of the formation 10 is possible in two ways.

The formation 10 can be pulled up to the second collar 9 as shown by the dashed line in FIG. 4. This holds in the case that the strain-relieving element 5 and possibly the electrical conductor 16 are guided out of the protective covering 4 into the annular groove 6. The strain-relieving element 5 and the electrical conductor 16 are not illustrated in FIG. 4 for a better overview.

A second possibility of the closure of the formation 10 can also be gathered from FIG. 4. In this case, the formation 10 extends up to behind an opening 15 in the wall of the first sleeve part 1 and is pulled up there at the wall of the first sleeve part. The opening 15 is furnished in the exemplified embodiment between the mouth 22 and a fourth collar 19 of the first sleeve part 1. This arrangement allows to guide the electrical conductor, designated with reference numeral 16 in FIG. 1, out of the first sleeve part 1. The strain-relieving element 5, on the other hand, is guided through the slot 7 into the annular groove 6.

The strain-relieving element 5 grips around and encircles the bottom of the annular groove 6 like a loop. The free ends 5a of the strain-relieving element 5 extend through the slot 7 in the direction of the protective covering 4, as it can be seen in FIG. 1 in connection with FIG. 2 and indicated by the arrow 17.

The free ends 5a of the loop-shaped section of the strain-relieving element 5 can be knotted at the transition of the bottom of the annular groove 6 into the slot 7, not shown in the figures, whereby a particularly good seat of the strain-relieving element 5 is achieved in the annular groove 6.

The first sleeve part 1 is inserted in its destination position in the second sleeve part 2 to such a depth until the second sleeve part 2 rests at a third collar 18. The third collar 18 thereby forms a stop for the insertion depth of the first sleeve part 1 into the second sleeve part 2. The second sleeve part 2 is furnished with an inner groove 2a near a free end 26 of the second sleeve part 2. The inner groove 2a is disposed such that the second collar 9 form-matchingly engages with the inner groove 2a when the second sleeve part 2 rests at the third collar 18 of the first sleeve part 1.

The suction hose 3 has spirally running wave troughs and wave crests at its outer jacket face. At least one thread turn 20 for screwing in the suction hose 3 is formed at the inner jacket face of the second sleeve part 2, as illustrated in FIG. 3.

It will be understood that each of the elements described above, or two or more together, may also find a useful application in other types of connection sleeves differing from the types described above.

While the invention has been illustrated and described as embodied in the context of a connection sleeve for a hose furnished with a protective covering for strain-relieved electrical conductors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A connection sleeve for a suction hose furnished with a protective covering for strain-relieved conductors, comprising a first sleeve part having an insertion end and a mouth;

a strain-relieving element disposed at the first sleeve part;

an annular groove furnishing a recess for the strain-relieving element and disposed at the first sleeve part, wherein the strain-relieving element is fixedly positioned in the annular groove;

a first collar forming a first wall of the-annular groove;

a second collar forming a second wall of the annular groove;

an axial slot starting at the insertion end of the first sleeve part, passing through the first collar, and extending up to the second collar, wherein the axial slot is open at a first end disposed at the insertion end of the first sleeve and closed at a second end;

a suction hose having an inner face and an outer face;

a second sleeve part encircling and gripping the suction hose and covering the annular groove;

a protective covering attached at the inner face of the suction hose, wherein the first sleeve part engages in part in the suction hose;

a tubular formation formed by flanks of the axial slot for receiving a coordinated end of the protective covering, wherein the formation is open at the first end of the axial slot and closed at the second end of the axial slot;

a section of the strain-relieving element forming a loop and encircling a bottom of the annular groove, wherein free ends of the loop are guided through the axial slot into the protective covering;

wherein the first sleeve part and the second sleeve part are connected to each other.

2. The connection sleeve according to claim 1, wherein the free ends of the loop are knotted at an area where the bottom of the annular groove passes into the axial slot.

3. The connection sleeve according to claim 1, further comprising wave troughs and wave crests spirally extending at said outer face of the suction hose;

at least one thread formed at an inner face of the second sleeve part for providing a screw connection to the wave troughs and wave crests of the suction hose.

4. The connection sleeve according to claim 1, further comprising
an inner groove disposed at the second sleeve part and form-matchingly engaging with the second collar near a free end of the second sleeve.

5. The connection sleeve according to claim 1, further comprising
a third collar disposed in front of the second collar as seen in direction toward the insertion end of the first sleeve part and forming a stop for a free front face of the second sleeve part.

6. The connection sleeve according to claim 5, further comprising
a fourth collar disposed at the first sleeve part in front of the third collar as seen in direction toward the insertion end of the first sleeve part;
an opening disposed on a face of the first sleeve part between a mouth of the first sleeve part and the fourth collar;
  wherein the tubular formation extends up to the opening, wherein the tubular formation is closed only behind said opening, and wherein the electrical conductors are guided from a coordinated end of the protective covering up to the opening and then out of said opening.

7. A connection sleeve for a suction hose furnished with a protective covering for strain-relieved conductors, wherein
a) the protective covering is attached at an inner jacket face of the suction hose, wherein a first sleeve part engages in part in the suction hose;
b) a recess is furnished in the first sleeve part, wherein a strain-relieving element, guided out of the protective covering, is fixedly positioned in said recess;
c) a second sleeve part, gripping around and encircling the suction hose, covers the recess;
d) the first sleeve part and the second sleeve part are connected to each other; wherein
e) the recess for the strain-relieving element (5) is an annular groove (6);
(f) an axial slot (7) extends from an insertion end (24) of the first sleeve part (1), wherein the axial slot (7) passes through a first collar (8), forming a first wall of the annular groove (6), and extends up to a second collar (9), forming a second wall of the annular groove (6);
g) flanks of the axial slot (7) pass over into a tubular formation (10), formed for receiving a coordinated end of the protective covering (4), wherein the formation (10) is open toward the end of the axial slot (7) and closed at the opposite end;
h) a section of the strain-relieving element (5), forming a loop, encircles a bottom of the annular groove (6), whereas free ends (5a) of the loop are guided through the axial slot (7) into the protective covering (4).

8. The connection sleeve according to claim 7, wherein the free ends (5a) of the loop are knotted at the transition from the bottom of the annular groove (6) into the axial slot (7).

9. The connection sleeve according to claim 7, wherein the suction hose (3) has spirally running wave troughs and wave crests at its outer jacket face, and wherein at least one thread (20) for screwing in the suction hose (3) is formed at an inner jacket face of the second sleeve part (2).

10. The connection sleeve according to claim 7, wherein the second sleeve part (2) exhibits an inner groove (2a) for a form-matching engagement of the second collar (9) near a free end (26) of the second sleeve (2).

11. The connection sleeve according to claim 7, wherein a third collar (18), disposed in front of the second collar (9), forms a stop for a free front face of the second sleeve part (2).

12. The connection sleeve according to claim 7, wherein the tubular formation (10) extends up to an opening (15) in the jacket of the first sleeve part (1), wherein the opening (15) is disposed between a mouth (22) of the first sleeve part (1) and a fourth collar (19), wherein the tubular formation (10) is closed only behind said opening (15), and wherein the electrical conductors (16) are guided from a coordinated end of the protective covering (4) up to the opening (15) and then out of said opening (15).

* * * * *